United States Patent
Chai et al.

(10) Patent No.: US 9,459,937 B2
(45) Date of Patent: Oct. 4, 2016

(54) METHOD FOR USING SHARED DEVICE IN APPARATUS CAPABLE OF OPERATING TWO OPERATING SYSTEMS

(71) Applicant: CHINA UNIONPAY CO., LTD., Shanghai (CN)

(72) Inventors: Hongfeng Chai, Shanghai (CN); Zhijun Lu, Shanghai (CN); Shuo He, Shanghai (CN); Wei Guo, Shanghai (CN); Yu Zhou, Shanghai (CN); Chengqian Chen, Shanghai (CN)

(73) Assignee: China UnionPay Co., Ltd., Shanghai (CN)

( * ) Notice: Subject to any disclaimer, the term of this patent is extended or adjusted under 35 U.S.C. 154(b) by 0 days.

(21) Appl. No.: 14/895,087

(22) PCT Filed: May 30, 2014

(86) PCT No.: PCT/CN2014/078881
§ 371 (c)(1),
(2) Date: Dec. 1, 2015

(87) PCT Pub. No.: WO2014/194793
PCT Pub. Date: Dec. 11, 2014

(65) Prior Publication Data
US 2016/0103716 A1     Apr. 14, 2016

(30) Foreign Application Priority Data
Jun. 4, 2013   (CN) .......................... 2013 1 0217898

(51) Int. Cl.
*G06F 13/00*     (2006.01)
*G06F 9/54*      (2006.01)

(52) U.S. Cl.
CPC ........................................ *G06F 9/54* (2013.01)

(58) Field of Classification Search
CPC ................................ G06F 9/541; G06F 9/544
USPC ............................................. 719/312, 319
See application file for complete search history.

(56) References Cited

U.S. PATENT DOCUMENTS

| 2008/0121687 A1* | 5/2008 | Buhot | G06Q 20/32 235/375 |
| 2010/0023449 A1* | 1/2010 | Skowronek | G06Q 20/10 705/39 |

(Continued)

FOREIGN PATENT DOCUMENTS

| CN | 1591367 A | 3/2005 |
| CN | 101093448 A | 12/2007 |
| CN | 103092305 A | 5/2013 |

OTHER PUBLICATIONS

International Search Report corresponding to International Application No. PCT/CN2014/078881 mailed Sep. 16, 2014.

*Primary Examiner* — Andy Ho
(74) *Attorney, Agent, or Firm* — Myers Bigel & Sibley, P.A.

(57) ABSTRACT

The invention discloses a method for using a shared apparatus in a device capable of running two operating systems, which includes using a first application in a first operating system to communicate with the share apparatus, and when the first operating system is switched to a second operating system, sending associated information on the shared apparatus to a second application in the second operating system so that the second application can use the associated information to communicate with the shared apparatus.

20 Claims, 1 Drawing Sheet

(56) References Cited

U.S. PATENT DOCUMENTS

| | | | | |
|---|---|---|---|---|
| 2013/0054473 A1* | 2/2013 | Jan | ................... | G06Q 20/40975<br>705/71 |
| 2013/0282502 A1* | 10/2013 | Jooste | ................... | G06Q 20/40<br>705/21 |
| 2014/0242905 A1* | 8/2014 | Steely | ...................... | H04B 5/00<br>455/41.1 |
| 2014/0273822 A1* | 9/2014 | Gutierrez | ............. | H04B 5/0031<br>455/41.1 |
| 2015/0134540 A1* | 5/2015 | Law | ..................... | G06Q 20/351<br>705/72 |

\* cited by examiner

METHOD FOR USING SHARED DEVICE IN APPARATUS CAPABLE OF OPERATING TWO OPERATING SYSTEMS

RELATED APPLICATIONS

This application is a 35 U.S.C. §371 national phase application of PCT Application PCT/CN2014/078881 filed May 30, 2014 which claims priority to Chinese Application No. 201310217898.3 filed Jun. 4, 2013. The entire content of each is incorporated herein by reference in its entirety.

FIELD OF THE INVENTION

The invention relates to a method for using a shared apparatus in a device capable of running two operating systems.

BACKGROUND

In the prior art such as mobile payment technology, for security purpose, the operating mode in a mobile device is classified into two modes: a normal mode and a secure mode. In the normal mode, the running environment of programs is generally a multi-media operating system, e.g., Android. In the secure mode, the running environment of programs is a closed, simple secure operating system. Programs in the normal mode have no access to resources in the secure mode, whereas programs in the normal mode can have access to all the software and hardware resources.

Typically, a device which is capable of running two operating systems such as a the mobile device is in the normal mode, i.e., in the multi-media operating system environment. When performing interaction of security-related information (e.g., entering the password of a bank card), the mobile device will be switched to the secure mode, i.e., to the secure operating system, and a secure program is initiated to perform processing of information. After the processing is completed, the mobile device is switched back to the normal mode so that a secure and reliable environment can be ensured for the user who is entering the password, thus preventing the password from being stolen by malware.

In the prior art, a solution shown in FIG. 1 is used to accomplish the processing of data stream from the normal mode to the secure mode. As shown, during communication between an application 1 and a shared apparatus, when it is required to process secure information, the application 1 will send a data message (e.g., information such as operation type and operation parameters) in a specified format to a secure application 1 via a communication framework interface layer; the secure application, after receiving the information and establishing communication with the shared apparatus, performs secure processing, and then returns the processing result to the application 1 via the communication framework interface.

In the above process, the secure application 1 requires to re-establish connection with the shared apparatus. That is, after corresponding information acquisition and operations on the shared apparatus by the application 1, the secure application 1 has to perform the same information acquisition and operations on the shared apparatus again, thus prolonging the processing time and decreasing response speed.

On the other hand, the processing result is returned to the application 1 via the communication framework interface and then sent to an external terminal by the application 1 via the shared apparatus, which will also prolong the processing time and decrease response speed.

SUMMARY OF THE INVENTION

According to an object of the invention, a method for using a shared apparatus in a device capable of running two operating systems is disclosed, which includes using a first application in a first operating system to communicate with the share apparatus, and when the first operating system is switched to a second operating system, sending associated information on the shared apparatus to a second application in the second operating system so that the second application can use the associated information to communicate with the shared apparatus.

Preferably, the second application directly sends a result of the communication with the shared apparatus to an external terminal via the shared apparatus.

Preferably, the associated information includes one or more of the followings: shared apparatus identifier, shared apparatus transmission-reception data interface address, shared apparatus configuration information, and a connection channel between the first application and the shared apparatus.

Preferably, the shared apparatus is NFC chip.

The advantage of the invention is that according to the method proposed by the invention for inheriting the operations on the shared apparatus, the flowchart of data is simplified, the processing time of applications is reduced, and the response speed of applications is improved; when the data generated by the secure application is the data that will be eventually sent to the outside via an external device, a switch to the normal application for transmission processing is not required, and the result is eventually output to the external terminal in a secure mode, thus ensuring the credibility of output data.

BRIEF DESCRIPTION OF THE DRAWINGS

Those skilled in the art will comprehend various aspects of the invention more clearly after reading the specific embodiments of the invention with reference to the accompanying drawings. It will be appreciated by those skilled in the art that the drawings are merely used for explaining the technical solutions of the invention in connection with the specific embodiments, and are not intended to limit the scope of protection of the invention.

DETAILED DESCRIPTION OF THE UTILITY MODEL

The specific embodiments of the invention will be further described in detail hereinafter with reference to the accompanying drawings. In the following description, for an illustrative purpose, many specific details are described so as to provide a thorough understanding of one or more aspects of the embodiments. However, it is obvious to those skilled in the art that one or more aspects of various embodiments can be implemented with these specific details provided to a less degree. Therefore, the following description should not be considered as limiting; rather, the scope of protection is defined by the appended claims.

The device of the invention can run a first operating system and a second operating system, wherein applications in the first operating system run in a first mode, and applications in the second operating system run in a second mode. The first mode can be for example a normal mode, and the second mode can be for example a secure mode.

Figure 1:
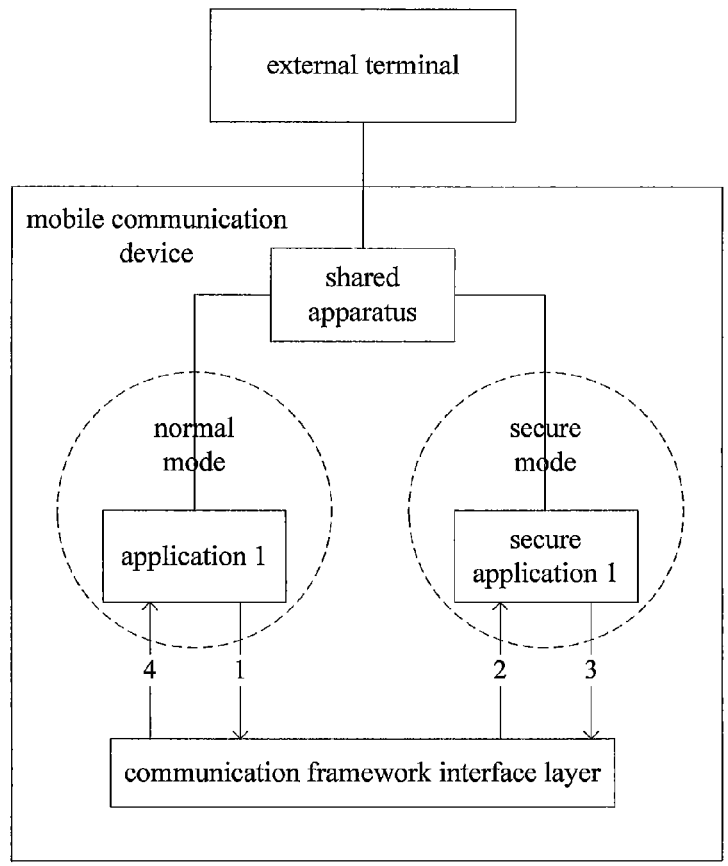
FIG. 1 is a schematic view of data stream when a shared apparatus is used in the prior art.
Figure 2:
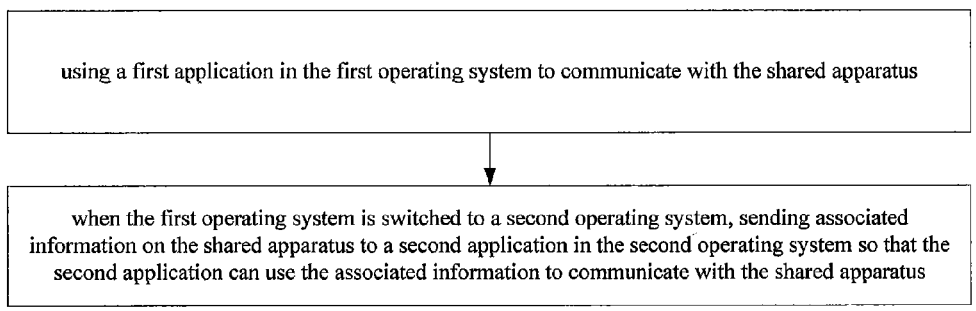
FIG. 2 is a schematic view showing the steps of a method for using a shared apparatus in a device capable of running two operating systems according to an embodiment of the invention.

As shown in FIG. 2, FIG. 2 is a schematic view showing the steps of a method for using a shared apparatus in a device capable of running two operating systems according to an embodiment of the invention.

At a first step, a first application in the first operating system is used to communicate with a shared apparatus.

At a second step, when a switch is made from the first operating system to the second operating system, associated information on the shared apparatus is sent to a second application in the second operating system so that the second application can use the associated information to communicate with the shared apparatus.

The above associated information can be contained in a data message in a specified format sent from the first application to the second application. For example, a domain can be added in the data message format as a shared apparatus domain for storing the associated information on the shared apparatus, such as shared apparatus identifier, shared apparatus transmission-reception data interface address, shared apparatus configuration information, and a connection channel between the first application and the shared apparatus, etc. The second application in the second operating system can use one or more of the above information to directly establish a connection with the shared apparatus without performing a corresponding information acquisition and operations on the shared apparatus for establishing the connection.

The extended data message can be also transmitted via a bottom layer communication framework interface layer, e.g., the transmission can be achieved by sharing a memory between the first application and the second application.

The second application may output the result to be generated to a specified shared apparatus by the associated information on the shared apparatus, whereby a first operation on the shared apparatus that has not yet been completed can be continued according to the associated information on the shared apparatus. In an example, the second application directly sends the result of the communication with the shared apparatus to an external terminal via the shared apparatus.

In another embodiment of the invention, the shared apparatus is NFC chip. In this case, the above device is a mobile communication device, e.g., cell-phone, and the NFC ship is disposed in the mobile communication device.

For example, in case of a cell-phone, a normal application in the cell-phone can set a corresponding channel number and a corresponding non-contact velocity for the NFC chip. When the user is having consumption and the cell-phone is placed on a non-contact POS terminal, a normal application program detects a command sent from the non-contact POS. For the sake of the safety of payment environment, the cell-phone is now switched to a secure application in the secure mode for running. Since the normal application already sent the information associated with the NFC chip (e.g., the created channel number) to the secure application during the switch, a process for re-creating a channel with the NFC chip is omitted for the secure application so that the channel that has already been successfully created by the normal application and the non-contact POS can be used directly for data interaction until the transaction is successfully completed.

Through the description of the above embodiments, those skilled in the art will understand that various modifications and variations can be also made to the specific embodiments of the invention without departing from the spirit and scope of the invention. All these modifications and variations will fall within the scope defined by the appended claims of the invention.

The invention claimed is:

1. A method comprising:
obtaining, by a non-secure application executing in a non-secure operating system, information associated with a communication channel opened with a shared apparatus;
determining that a switch in operation from the non-secure operating system to a secure operating system is necessary; and
sending, based on the determining and by the non-secure application, the information associated with the communication channel to a secure application executing in the secure operating system, wherein the information associated with the communication channel is configured such that the secure application uses the information associated with the communication channel to communicate with the shared apparatus and with an external terminal via the communication channel.

2. The method according to claim 1, wherein the secure application sends a result of communicating with the shared apparatus to an external terminal via the shared apparatus.

3. The method according to claim 1, wherein the information associated with the communication channel includes one or more of a shared apparatus identifier, a shared apparatus transmission-reception data interface address, a shared apparatus configuration information, and a connection channel identifier.

4. The method according to claim 1, wherein the shared apparatus comprises a near field communication (NFC) chip.

5. A method comprising:
receiving, by a mobile communication device, a command from a non-contact point of sale (POS) terminal, wherein the command comprises a channel number indicating a communication channel opened between the mobile communication device and the non-contact POS terminal via a shared apparatus;
responsive to the receiving of the command, switching, by a processor of the mobile communication device, an operation mode of the mobile communication device from a non-secure mode executing a non-secure application program to a secure mode executing a secure application program, wherein the switching comprises sending the channel number by the non-secure application program to the secure application program; and
transmitting, by the secure application program, transaction data to the shared apparatus using the communication channel.

6. The method of claim 5, wherein the switching further comprises sending, by the non-secure application program to the secure application program, at least one of a shared apparatus identifier, a shared apparatus transmission-reception data interface address, and shared apparatus configuration information.

7. The method of claim 5, wherein the shared apparatus comprises a near field communication (NFC) chip.

8. The method of claim 5, wherein the transaction data comprises data indicative of a password.

9. The method of claim 5, wherein the sending of the channel number by the non-secure application program to the secure application program comprises sending, from the non-secure application program to the secure application program, a data message comprising a predefined format.

10. The method of claim 5, wherein the sending of the channel number by the non-secure application program to the secure application program comprises sharing a memory location between the non-secure application program and the secure application program.

11. The method of claim 5, wherein the sending of the channel number by the non-secure application program to the secure application program comprises sending a data message via a communication framework interface layer.

12. The method of claim 5, further comprising:
instantiating a first communication session using the shared apparatus by the non-secure application program prior to the switching of the operation mode of the mobile communication device from the non-secure mode executing the non-secure application program to the secure mode executing the secure application program;
performing, prior to completion of the first communication session, the switching of the operation mode of the mobile communication device from the non-secure mode executing the non-secure application program to the secure mode executing a secure application program;
pausing the first communication session responsive to the switching;
performing the transmitting by the secure application program of the transaction data to the shared apparatus; and
continuing the first communication session using the shared apparatus and using the transaction data.

13. The method of claim 5, further comprising:
transmitting, by the secure application program, the transaction data to the non-contact POS terminal via the shared apparatus and using the communication channel.

14. The method of claim 5, further comprising:
transmitting, by the secure application program, further transaction data to the non-contact POS terminal via the shared apparatus and using the communication channel.

15. A mobile communication device, comprising:
a processor;
a near field communication (NFC) chip; and
a non-transitory computer memory storing contents of a non-secure operating system and secure operating system and further storing instructions that, when executed by the processor, cause the processor to:
receive, into a working memory associated with a non-secure application program operating in the non-secure operating system, a command from a non-contact point of sale (POS) terminal remote from the mobile communication device, wherein the command comprises channel information associated with a communication channel opened between the mobile communication device and the non-contact POS terminal via the NFC chip;
switch an operation mode of the mobile communication device from the non-secure operating system to the secure operating system, wherein the switch comprises storing the channel information into a memory location accessible to both the non-secure application program and a secure application program operating in the secure operating system; and
transmit, from a working memory associated with the secure application program, transaction data to the NFC chip using the communication channel.

16. The mobile communication device of claim 15, wherein the non-transitory computer memory stores further instructions that, when executed by the processor, cause the processor to:
transmit, from the working memory associated with the secure application program, the transaction data to the non-contact POS terminal via the NFC chip and using the communication channel.

17. The mobile communication device of claim 15, wherein the non-transitory computer memory stores further instructions that, when executed by the processor, cause the processor to:
transmit, from the working memory associated with the secure application program, further transaction data to the non-contact POS terminal via the NFC chip and using the communication channel.

18. The mobile communication device of claim 15, wherein the channel information comprises at least one of an identifier of the NFC chip, a transmission-reception data interface address of the NFC chip, configuration information associated with the NFC chip, and a channel number associated with the communication channel.

19. The mobile communication device of claim 15, wherein the processor is configured to perform the switch responsive to receiving an instruction from the non-secure application program or the non-contact POS terminal indicating that entry of secure information by a user operating the mobile communication device is required.

20. The mobile communication device of claim 15, wherein the non-transitory computer memory stores further instructions that, when executed by the processor, cause the processor to:
instantiate a first communication session using the NFC chip based on operation of the non-secure application program;
perform, prior to completion of the first communication session, the switch of the operation mode of the mobile communication device from the non-secure operating system to the secure operating system;
pause the first communication session responsive to the switch; and
continue the first communication session using the NFC chip and using the transaction data transmitted from the working memory associated with the secure application program.

* * * * *